US012753629B2

(12) United States Patent
Flaig

(10) Patent No.: US 12,753,629 B2
(45) Date of Patent: Oct. 6, 2026

(54) DOOR HANDLE HAVING ACTUATION ELEMENT FOR DISINFECTING A GRIP SURFACE OF THE DOOR HANDLE, AS WELL AS DOOR HANDLE FITTING AND DOOR

(71) Applicant: Hartmut Flaig, Aldingen (DE)

(72) Inventor: Hartmut Flaig, Aldingen (DE)

( * ) Notice: Subject to any disclaimer, the term of this patent is extended or adjusted under 35 U.S.C. 154(b) by 487 days.

(21) Appl. No.: 18/013,734

(22) PCT Filed: May 28, 2021

(86) PCT No.: PCT/EP2021/064308
§ 371 (c)(1),
(2) Date: Dec. 29, 2022

(87) PCT Pub. No.: WO2022/002498
PCT Pub. Date: Jan. 6, 2022

(65) Prior Publication Data

US 2023/0203838 A1 Jun. 29, 2023

(30) Foreign Application Priority Data

Jun. 29, 2020 (DE) ......................... 202020103744.7
Feb. 3, 2021 (DE) ......................... 202021100546.7

(51) Int. Cl.
*E05B 1/00* (2006.01)

(52) U.S. Cl.
CPC .................................. *E05B 1/0069* (2013.01)

(58) Field of Classification Search
CPC .... A47K 17/02; A47K 17/022; A47K 17/024; A47K 5/12; A61L 2/26; A61L 2/18; E05B 1/0069

(Continued)

(56) References Cited

U.S. PATENT DOCUMENTS 2,784,878 A * 3/1957 Theodorou ............ B65D 83/75 137/596.2
3,964,501 A * 6/1976 Matchett ................ A45D 24/22 132/112

(Continued)

FOREIGN PATENT DOCUMENTS

CA 2161935 A1 5/1997
CA 2887383 A1 4/2014

(Continued)

OTHER PUBLICATIONS

International Search Report and Written Opinion dated Aug. 17, 2021 for corresponding application PCT/EP2021/064308.

*Primary Examiner* — Emily M Morgan
(74) *Attorney, Agent, or Firm* — Bachman & LaPointe, P.C.

(57) ABSTRACT

The invention relates to a door handle having an actuation element (12) for sanitizing a handle surface (14) of the door handle (10), the actuation element (12) delimiting a hollow (16) in the interior of the door handle (10) in a non-actuated first position, the door handle (10) being pierced by a channel (24) in order to guide a liquid to the hollow (16). According to the invention, the hollow (16) is sealed by at least one sealant (18) between a first sealing surface (20) of the actuation element (12) and a second sealing surface (22) of the door handle (10), a cutout (32) being formed in at least one of the sealing surfaces (20, 22) in order to release the sealant (18) from at least one sealing surface (20, 22) in a second position of the actuating element (12) decreasing the volume of the hollow (16), the liquid being displaced from the hollow (16) towards the handle surface (14).

16 Claims, 6 Drawing Sheets

(58) Field of Classification Search
USPC .................................................... 16/904, 412
See application file for complete search history.

(56) References Cited

U.S. PATENT DOCUMENTS

| | | | | |
|---|---|---|---|---|
| 4,921,131 | A * | 5/1990 | Binderbauer | G01F 13/006 222/105 |
| 8,551,398 | B1 * | 10/2013 | Strombeck | E05B 1/0069 422/291 |
| 2004/0237255 | A1 * | 12/2004 | Lin | E05B 1/0069 16/904 |
| 2007/0045966 | A1 * | 3/2007 | Jiang | F16J 15/344 277/404 |
| 2008/0305020 | A1 * | 12/2008 | Oshmyansky | E05B 1/0069 422/291 |
| 2010/0147974 | A1 | 6/2010 | Cunningham et al. | |
| 2013/0279966 | A1 * | 10/2013 | Roberts | A61L 2/10 401/207 |
| 2014/0338153 | A1 * | 11/2014 | Dopatka | E05B 1/0069 16/110.1 |
| 2019/0330883 | A1 * | 10/2019 | Rafko | A61L 2/0088 |
| 2023/0235593 | A1 * | 7/2023 | Rafko | A61L 2/26 222/192 |

FOREIGN PATENT DOCUMENTS

| | | | |
|---|---|---|---|
| CN | 101111449 | A | 1/2008 |
| CN | 101466908 | A | 6/2009 |
| CN | 101720234 | A | 6/2010 |
| CN | 106522655 | A | 3/2017 |
| CN | 107580505 | A | 1/2018 |
| DE | 202004006845 | U1 | 8/2004 |
| DE | 202011105304 | U1 | 11/2011 |
| DE | 102012017365 | A1 | 3/2013 |
| DE | 202016104190 | U1 | 11/2017 |
| EP | 2095830 | A1 | 9/2009 |
| EP | 3118395 | A2 | 1/2017 |
| EP | 3306016 | A1 | 4/2018 |
| GB | 2436284 | A | 9/2007 |
| JP | 2013527890 | A | 7/2013 |
| KR | 101735241 | B1 | 5/2017 |
| WO | 2011047653 | A1 | 4/2011 |
| WO | 2019234064 | A2 | 12/2019 |

* cited by examiner

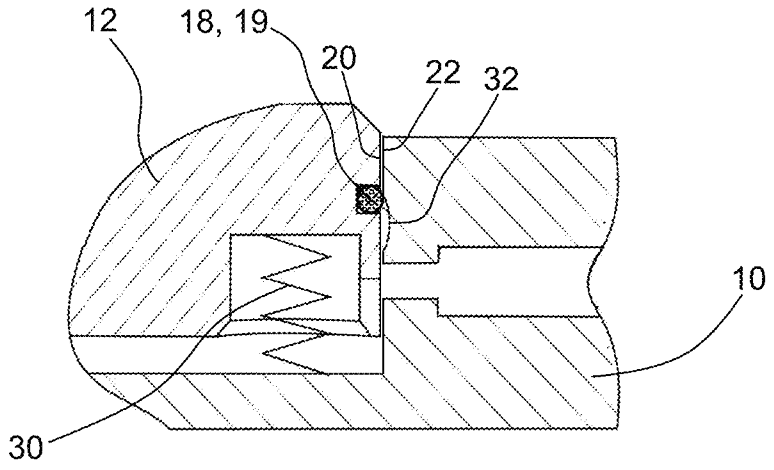
Fig. 3a
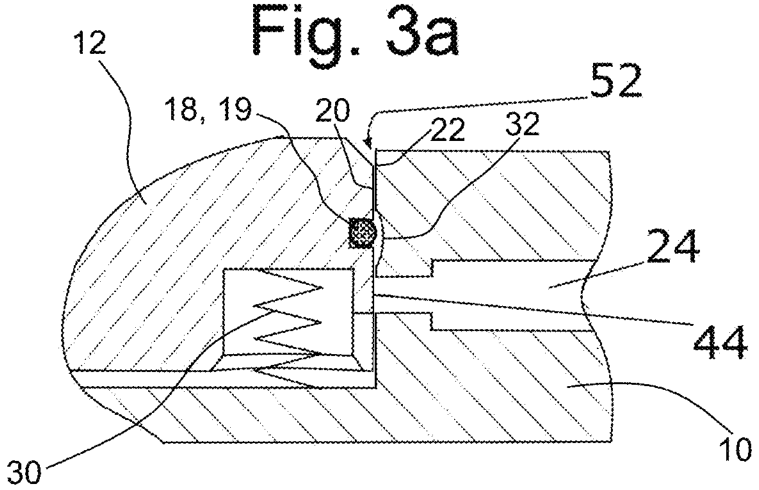
Fig. 3b
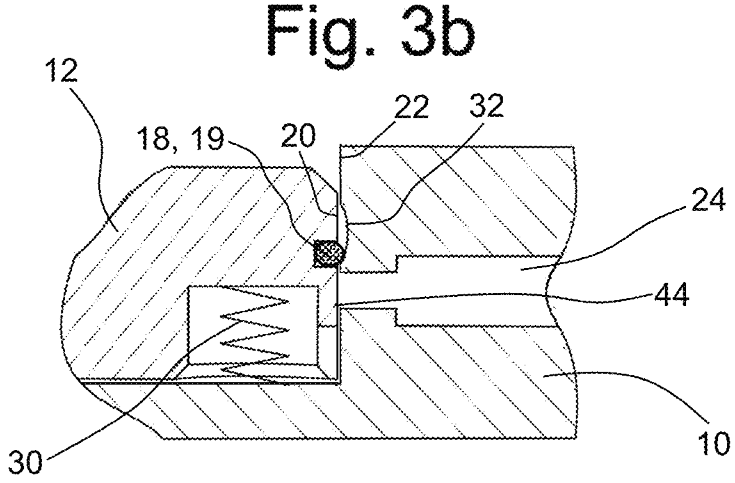
Fig. 3c
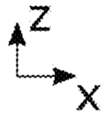

DOOR HANDLE HAVING ACTUATION ELEMENT FOR DISINFECTING A GRIP SURFACE OF THE DOOR HANDLE, AS WELL AS DOOR HANDLE FITTING AND DOOR

BACKGROUND OF THE INVENTION

The invention at hand relates to a door handle, a door fitting having a door handle, a pull handle and a door having a door fitting according to claim 13 and/or having a pull handle.

Generic door fittings consist of a door handle, a bolt and a mounting element to fasten the bolt to a door leaf. A torsion spring as a return element of the door handle can be found in the mounting element in order to return the door handle to a typically horizontal base position after manually actuating, rotating or pressing the door fitting and opening a door lock.

Alternatively or additionally to the door fitting, the door handle can also be designed as a pull handle and be fixedly, in particular non-rotationally, mounted on the door leaf, the door generally being able to be used by means of the pull handle in the open state of a door lock and having a return element in a door hinge in order to independently close the door after actuation. This allows opening the door preferably in particular via a pure pulling movement on the pull handle. Often, this pull handle is mounted on the door leaf as a bracket handle.

In particular for indoor and/or outdoor doors in public facilities, such as schools and hospitals, and/or companies where doors are actuated manually by a large number of different users, there is a risk of transmitting potentially hazardous pathogens or germs via the contact with the door handle. Particularly in these facilities, regular sanitization of the door handle and the simultaneous sanitization of the user's palm are required.

US 2014/338153 A1 discloses a device for sanitizing a manually actuatable door handle which has a container for a liquid sanitizer. The door handle is formed having an element in the form of a shell or casing which is slid onto the outer surface of the handle and stores sanitizer. The sanitizer-storing element consists of a spongy material having the property of temporarily storing sanitizer and to discharge it when applying an outer pressure. As soon as a user exerts pressure on the sanitizer-storing element, the sanitizer is dispensed via the pores of the element and wets its outer surface, whereby the handle surface and the user's hand touching the handle is sanitized.

DE 10 2012 017 365 A1 also discloses a device for sanitizing a door handle upon actuation of the door fitting. The door handle of the door fitting has a hollow on the inside filled with sanitizer. The hollow is connected to a sheath made of a foamed material or a spongy material via bores. When a pressure is exerted on the foamed material via the fingers of a hand, the foamed material is compressed and the sanitizer is pushed outward from the foamed material and thus comes into contact with the entire hand.

GB 2 436 284 A shows a door handle which in contrast to a door fitting is fixedly mounted on a door leaf as a pull handle. The door handle has a foamed-material-like element which fills a hollow within the door handle and partially forms the surface of the door handle. A sanitizer container is integrated in the pull handle above the hollow, and the pull handle is mounted in such a manner on the door leaf that the sanitizer flows independently from the container to the foamed-material-like element. By actuating and gripping the door handle, the foamed material is compressed and the sanitizer is dispensed into a user's hand.

Spongy materials or foamed materials typically have an uneven surface with a plurality of open pores. Such surfaces or materials, however, are only passably suitable for hygienic use, since impurities and germs can easily cling to the pores. In particular the cleaning of the surface all the way to the pores is complicated, as the entire foamed material possibly has to be regularly dismounted and exchanged. Furthermore, the dispensed amount of sanitizer can only be adjusted with difficulty and an unevenly distributed pressure on the handle surface favors irregular and partially increased dispensing of sanitizer. This favors forming drops, whereby liquid can gather on the floor below the door handle unintentionally. Furthermore, the container of the sanitizer must be refilled in short and irregular intervals.

EP 3 118 395 B1 describes a cover element or a type of tube having opening gaps, the cover element being able to be disposed on a provided door handle, the cover element also being connected to a container for sanitizer. As soon as a user exerts a pressure on the cover element, in particular while actuating a door fitting by means of the door handle, the opening gaps acting as valves are opened and the sanitizer flows from a container to a handle area of the door handle under the influence of gravity.

Furthermore, DE 20 2004 006 845 U1 discloses a door handle having a hollow for guiding sanitizer, the door handle consisting of a plastic and having flaps as actuation elements which can be compressed by means of a pressure exerted by a user so that the sanitizer in the interior of the door handle flows to the handle surface under the influence of gravity.

While the actuation elements mentioned above acting as valves enable sanitizer to flow to the area of the handle surface of a door handle, the continued flowing of sanitizer while actuating the door handle, however, is not stopped. Thus, the dispensing of sanitizer depend on the duration of the actuation. This results in irregular and possibly excessive consumption of sanitizer including unintentional forming of drops and increased consumption without any additional benefits regarding the sanitizing effect. In this instance as well, a porous handle surface or a handle surface having differing indentations are prone to impurities and have a surface which is difficult to clean. In particular if a spongy material is disposed additionally within the door handle, impurities can be difficult to remove or the material must be replaced regularly.

SUMMARY OF THE INVENTION

The object of the invention at hand is to propose a door handle which sanitizes the handle surface of the door handle and, where applicable, a user's hand upon actuating the door fitting while avoiding the problems known from the state of the art.

This object is attained by a door handle having the features as disclosed herein, by a door fitting as disclosed herein and a door as disclosed herein.

Advantageous embodiments are also disclosed herein and are the subject matter of the dependent claims.

According to the invention, a door handle, in particular for indoor and/or outdoor doors in public facilities and/or companies, is proposed having an actuation element for sanitizing a handle surface of the door handle, the actuation element being disposed at least partially in the door handle and delimiting a hollow in the interior of the door handle in a first non-actuated position, the door handle being pierced by a channel which opens into the hollow on one end and has a connector on another end for being connected to a container in order to guide a liquid, in particular a sanitizer, from the container to the hollow via the channel and connector, the actuation element being manually displaceable against at least one return element. For this purpose, the hollow is sealed by means of at least one sealant between a first sealing surface of the actuation element and a second sealing surface of the door handle, a cutout being formed in at least one of the sealing surfaces in order to release the sealant from at least one sealing surface in a second position of the actuating element decreasing the volume of the hollow with respect to the first position and to displace the liquid from the hollow towards the handle surface, a blocking section of the first sealing surface being disposed and oriented such at a transition between the hollow and the channel that the blocking section of the actuation element at least partially closes or blocks the channel when displacing the actuation element from the first to the second position, the sealant abutting against both sealing surfaces in a third position of the actuation element further reducing the volume of the hollow with respect to the second position in order to entirely close the channel and/or the hollow.

In this process, the invention has discovered surprisingly that a defined amount of sanitizer flows to the handle surface because of the design of the door handle according to the invention after an actuation element has been used. In this context, the actuation element simultaneously acts as a valve for opening and closing the channel and for accessing sanitizer and as a type of positive-displacement pump in order to convey the liquid from the hollow to the handle surface. The actuation element thus does not require gravity to convey a liquid from the hollow to the handle surface. Preferably, gravity is required exclusively for refilling the hollow after an actuation procedure, in particular if the actuation element is in the first position or is returned to the first position after having been actuated or displaced. This design therefore allows pumping a defined liquid volume from the hollow to or on the handle surface, whereby a dripping of excess liquid on the floor can be prevented, for example. The door handle having the actuation element therefore is leak-proof in a sense when the door handle or the actuation element is continuously actuated. This defined dispensing of liquid furthermore can reduce the frequency of refilling the container or a smaller container can be used. Overall, an efficient use of the liquid is thus made possible.

Furthermore, the preferably two-piece door handle having the actuation element can be easily mounted and produced. For instance, no other valve elements having wire gearing or spongy foamed materials or other complex positioning mechanisms need to be installed which not only make production more complicated but in particular can only be cleaned with difficulty and favor germs accumulating there. Moreover, the handle surface does not have a plurality of pores or indentations, thus creating an unfavorable environment for microbial growth with the added benefit of being particularly easy to clean.

According to a preferred embodiment, the actuation element is partially disposed in such a manner in the door handle that a positioning movement of the actuation element reducing the volume of the hollow can be executed in the direction of gravity in a state of the door handle mounted on a door leaf. In this case, the door handle is preferably horizontal and vertical to the direction of gravity. This achieves that the actuation element is displaced simultaneously to the liquid being evenly displaced from the hollow via the actuation element and being distributed evenly on the handle surface upon using and pressing the door handle to a second position. The liquid is preferably displaced evenly along the entire circumference of the actuation element between the sealing surfaces of the actuation element and the door handle.

Alternatively, the door handle can be disposed on the door leaf in a different orientation. It would then also be possible to displace the actuation element by the user's hand gripping the door handle from both sides in the area of the actuation element and of the side of the door handle opposite the actuation element and the hand forming a first on the handle.

In another preferred embodiment, the container is connected to an outlet side or an outlet section on the door handle in a liquid-tight manner in the direction of gravity, preferably screwed in place or, for safety reasons, glued or welded to the door handle, preferably by means of laser welding. This preferred arrangement of the container in the direction of gravity ensures that liquid can flow in the channel and to the hollow by means of gravity. The container is preferably disposed on the door handle itself and on an area of the door handle facing the bolt. As previously described, the function of the door handle and the actuation element is designed such that only a liquid volume corresponding approximately to the volume of the hollow flows to the handle surface when the actuation element is actuated, it being prevented that the liquid continues to run from the container. This results in a particularly economic use of sanitizer, and relatively small containers, preferably smaller than 100 ml to 150 ml can be used. A container of this kind is suitable for 100 to 150 actuation cycles and does not have to be refilled often.

Further preferably, the sealant is an elastic O-ring, which is fit into a groove in one of the sealing surfaces of the actuation element or of the door handle, the cutout and the groove being formed in one of the sealing surfaces of the actuation element or the door handle, respectively. In particular in the second position of the actuation element, the cutout is opposite the groove, meaning the distance of the sealing surfaces becomes larger in comparison to the first position of the actuation element and the O-ring is released from at least one of the sealing surfaces and a displacement of the sanitizer liquid from the hollow to the handle surface becomes possible.

Particularly preferably, the O-ring is a solvent-resistant O-Ring, for example made of a nitrile rubber, a fluororubber or a carbon rubber.

In the first position of the actuation element, it is preferably intended that an adherence between the sealant and the sealing surfaces is larger than the force of the return elements in order to attain a wedged fixation of the actuation element in the door handle. At the least, a balance is achieved between the force of the return element and the adherence of the sealant on the sealing surfaces. While mounting or dismounting, merely the adherence of the sealant has to be overcome to fit the actuation element in the hollow of the door handle or to release it therefrom. For mounting, the actuation element can be inserted into the door handle preferably manually and be pushed to the first position. For dismounting, an overpressure can be generated via the channel, for example by means of pressurized air, to release the sealant from the sealing surfaces. In place of pressurized air, the actuation element can also be wedged into and be pulled out of the door handle using a tool. The adherence is preferably selected such or so large that the self-adherence described above is retained over a plurality of actuation cycles, even when the sealant has become slightly worn.

In other words, it is preferably intended that the actuation element can be fixated solely within the door handle via the sealant, in particular an O-ring, and preferably no further fastening elements are required for fastening the actuation element.

Alternatively, the actuation element can be fastened in the first position against the force of the return element using a fastening pin or a different geometric stop; however, this increases the number of parts of the door handle and the mounting or dismounting along with the production is made unnecessarily more complex. Furthermore, build-up can collect in the areas of the actuation pin or the geometric stop, meaning cleaning and hygienic properties of the door handle are impaired.

Preferably, several springs, particularly preferably two springs, even more preferably three springs, in particular spiral coiled springs, are provided as return elements or return means, which each are guided in an indentation, in particular a blind bore, in the actuation element. The spring is preferably a pressure spring.

The door handle is preferably designed as a cylindrical round component having a preferred diameter between 18 mm and 22 mm, the hollow preferably being formed as an oblong hole in the door handle having a length between 65 mm and 75 mm and a breadth between 10 mm and 14 mm. In the mounted state of the actuation element, a gap between the sealing surfaces of the actuation element and the door handle outside of the cutout is preferably 0.1 mm and 0.5 mm wide. In this instance, the actuation element is preferably formed according to the shape of the oblong hole, the dimensions of the actuation element being selected such that the gap is set between the sealing surfaces.

The volume of the hollow in the first position of the actuation element preferably corresponds to 2.2 $cm^3$ to 3 $cm^3$. A hollow of this kind provides just the right amount of sanitizer to wet the handle surface and preferably a user's palm too. The volume is small enough to prevent drops from forming in the handle surface.

Further preferably, the door handle and the actuation element are made of a metal, preferably aluminum or stainless steel or alternatively a copper alloy. Preferably, metals having antibacterial or antimicrobial effects are used to create an unfavorable environment for the growth of germs and pathogens. Moreover, the metal door handles are preferably particularly resistant to a plurality of antimicrobial cleaning agents.

Alternatively, the door handle and/or the actuation element can also be made of plastic having a preferably antibacterial or antimicrobial surface or surface coating, preferably made in an injection molded method. While this allows producing the door handle in large numbers, the chemical resistance can possibly be reduced and the surface must be processed additionally to create unfavorable conditions for germ growth.

In a preferred embodiment, the handle surface has a rough surface treated abrasively, preferably by means of sand jets or shot-blasting, having a surface roughness between 20 μm and 40 μm measured according to ISO 8503, in order to enlarge the contact angle between the handle surface and a sanitizer. According to ISO 8503, the surface roughness is the mean maximum peak-to-valley height between the surface peak and valley. This achieves that the sanitizer better wets the handle surface and drops are prevented from forming. A liquid remains longer on the handle surface for this reason and thus acts advantageously for the sanitization of the handle surface.

The invention preferably comprises a door fitting having a bolt and a door handle having an actuation element, the door handle being mounted at a right angle to the bolt and is screwed in place to prevent a rotation about a longitudinal center axis of the door handle.

Preferably, the pressure for actuating the door fitting, in particular the force for deforming a torsion spring in the mounting element of the bolt, corresponds to at least a force to push the actuation element to the third position against the force of the return element. This ensures that the actuation element closes the hollow and/or the channel in the third position upon actuation of the door fitting and thus a further unintentional supply of liquid from the container is interrupted.

Particularly preferably, the door fitting is designed in two pieces having a door handle and a bolt, the door handle, preferably with the container, being able to be mounted on the bolt in a detachable manner. Advantageously, the door handle, preferably with the container, can thus be easily and quickly mounted and/or dismounted, retrofitted, exchanged and/or cleaned or sanitized, the bolt preferably being able to remain mounted on the door.

Furthermore, the invention also comprises a door having a door fitting as described above, the door handle being mounted on one or both sides of a door. In particular a detachable connection of the door handle having the bolt allows a mounting on both sides of a door, unlike a one-piece design of a door handle having a bolt.

Moreover, it is conceivable for a container to be fixed to the door leaf of the door and is connected to the channel of the door handle by means of a connector, in particular a tube.

Additionally or alternatively to the door fitting, the door handle having the actuation element can also be designed as a pull handle, in particular a bracket handle, for actuating a door.

For this purpose, the pull handle has accommodators which, in conjunction with the door handle, form a preferably cylindrical or tube-shaped handle bar having a shared extension axis, the accommodators forming the container for receiving the liquid as a first tube-shaped accommodating section which is connected to the connectors of the door handle. Advantageously, the number of parts of the pull handle can be reduced by the container being integrated in the handle bar, and the mounting or retrofitting of existing pull handles can be simplified. Advantageously, no separate container having tube connections is required in the door leaf. Furthermore, a user can advantageously use the pull handle in the area of the accommodators. The thus formed container therefore also forms a section of the pull handle which can be gripped by the user.

Preferably, the door handle, in particular as a cylindrical round component, is connected to the first tube-shaped accommodating section one on end and to a second tube-shaped accommodating section in an insertable manner on another end, the previously described connector of the door handle having circumferential sealants to seal the first tube-shaped accommodating section as a container. The accommodators having the channel for conducting the liquid from the container to the hollow of the door handle is preferably formed as a cylindrical connection section of the door handle, which is reduced in its cross section, preferably along the extension axis of the handle bar, the sealants being disposed along the circumference of the cylindrical connection section.

Preferably, the cylindrical door handle has the cylindrical accommodators and thus the handle bar has an identical diameter. Advantageously, this does not yield cross-sectional protrusions between the door handle and the accommodators, meaning the handle bar can be cleaned particularly easily and impurities cannot gather in the cross-sectional protrusions. The connectors of the door handle are disposed within the accommodators in the mounted state.

As sealants, O-rings are preferably disposed in a guide groove in the outer circumference of the connector, in particular of the cylindrical connection section, of the door handle, the O-rings being pressed in such a manner against an inner side of the first tube-shaped accommodating section in the mounted state that the container is sealed in the direction of the door handle and the door handle is preferably simultaneously connected to the first accommodating section in a force-fit manner. This allows easily mounting the door handle, in particular without a screw connection, and simultaneously sealing the container on one end. On the other end, the container is closed using a preferably insertable lid for refilling.

Alternatively, the lid can close and seal the container by means of a screw connection, preferably using a sealing ring.

Preferably, the lid has a closing mechanism or can be actuated preferably using special tools or using a special wrench to ensure anti-theft protection or to prevent an unwanted filling of the container. The closing mechanism can be configured as a lock within the lid actuatable with a key, a securing element rotatable with the key being connected to the container in the closed state in a form-fitting manner, in particular in a notch of the inner side of the container, or to the container in a force-fit manner. For using a special tool, the lid preferably has notches, in particular two bores, preferably in its outer front face, the special tool being designed to engage into these notches in a form-fitting manner and to actuate, in particular rotate, the preferably screwed-on lid.

Preferably, this lockable or anti-theft lid is designed for a container of the pull handle and for a container mounted on a door fitting or the door handle itself.

Preferably, the door handle can be inserted additionally in the second accommodating section by another cylindrical connection section to ensure a form-fitting connection of the door handle to the door leaf in a mounted state. For this purpose, the first and the second accommodating section are designed such that the door handle is disposed centrally on the handle bar.

The invention further comprises a door having at least one previously described pull handle, the cylindrical handle bar of the pull handle being mounted on the accommodators on one or both sides of the door using at least one mounting element.

Preferably, the accommodator is designed as a first and second accommodating section, a mounting element each being disposed on the first and the second accommodating section. This positioning allows the pull handle as a handle bar having mounting elements to form a type of bracket handle, the door handle having the actuation element being disposed preferably in the center of the bracket handle.

Via the accommodators, a handle bar can thus be formed by means of which the door handle is mountable on the door leaf, and simultaneously the container can be integrated in the handle bar in a space-saving manner.

The actuation element of the door handle is preferably disposed in such a manner on a side of the handle bar opposite the mounting elements that a user simultaneously uses or opens the door and actuates the actuation element using the pressure against the return elements via a pulling actuation or by exerting a pressure on the handle bar, in particular using the palm.

Preferably, the pressure for actuating the pull handle, in particular the force for opening the door against return elements in the door hinges, corresponds to at least a force in order to displace the actuation element to the third position against the force of the return elements. This ensures that the actuation element closes the hollow and/or the channel in the third position and thus a continued, unintentional supply of liquid from the container is interrupted upon actuation of the pull handle.

Alternatively, the actuation element can be disposed in a rotated manner about the extension axis of the handle bar by 180° with regards to the orientation preferred for a pressure movement, the user then preferably gripping the actuation element using their fingers and opening the door via a pulling movement on the handle bar while simultaneously displacing the actuation element.

A further alternative foresees disposing the actuation element between the mentioned orientations preferred for a pulling or pressure movement about the extension axis of the handle bar, a lateral orientation, in particular rotated by 90° with regards to the orientation for the pressure movement, being preferred. Preferably in this lateral orientation, the actuation element can be actuated via a lateral pressure on the actuation element or by gripping the handle bar and a fisting of the user's hand.

Preferably, the extension axis of the pull handle and the longitudinal center axis of the door handle are oriented such that a liquid flows to the door handle in the first tube-shaped receiving section by means of gravity, in particular via the channel of the connector, the extension axis of the pull handle preferably being oriented parallel to the direction of gravity.

BRIEF DESCRIPTION OF THE DRAWINGS

In the following, details and embodiments of the invention are described by means of merely schematic drawings.

FIG. 3*a* to FIG. 3*c* each show a detailed view of the actuation element and the door handle according to FIG. 2*a* in a first, second and third position of the actuation element;

DETAILED DESCRIPTION

Figure 1:
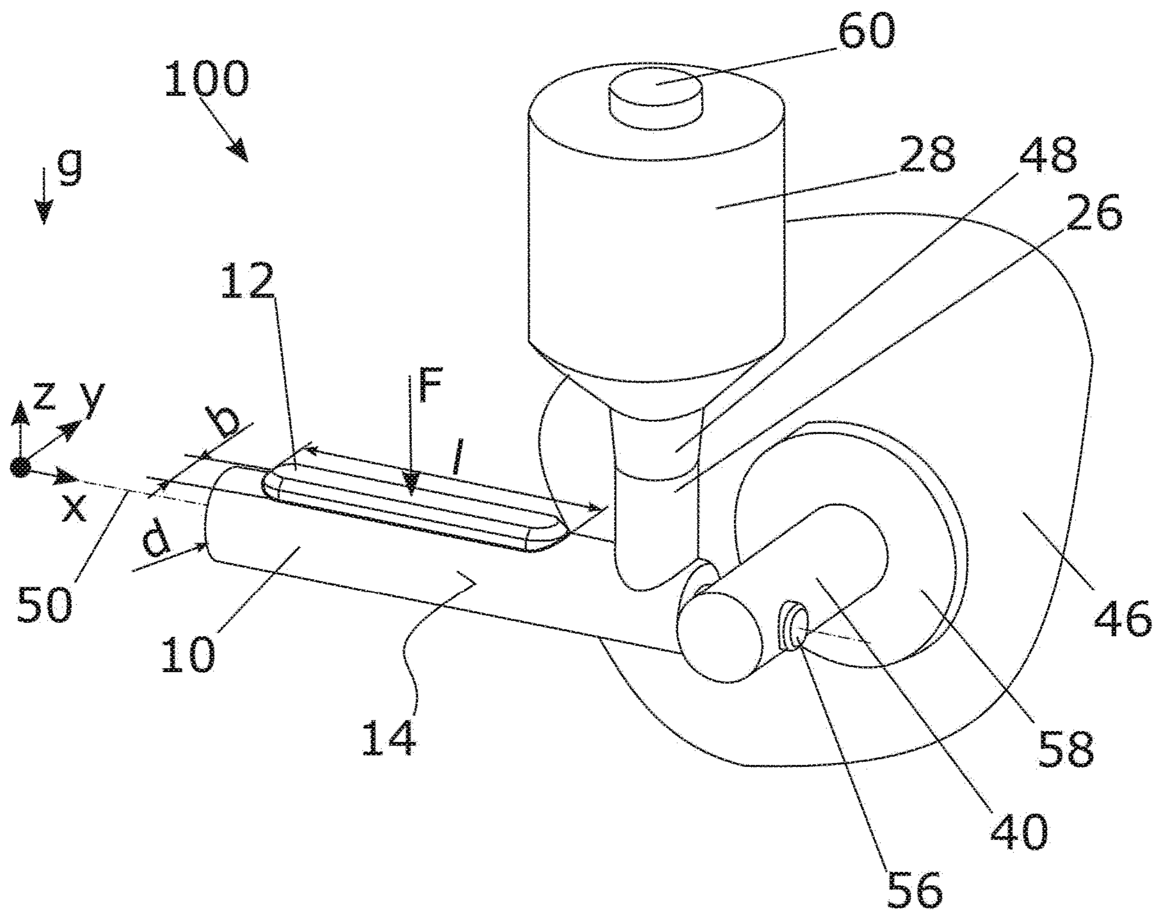
FIG. 1 shows a perspective view of a door fitting having a bolt and a door handle having an actuation element and container in a state mounted on a door leaf.

In FIG. 1, a door fitting 100 is shown, a door handle 10 having an actuation element 12 and a container 28 being mounted on a bolt 40 which in turn is mounted on a door leaf 46. A non-actuated first position of actuation element 12 is shown, a part of actuation element 12 preferably protruding from door handle 10, akin to a button. The surfaces of actuation element 12 and of door handle 10 together form a handle surface 14 via which door fitting 100 and actuation element 12 can preferably be used manually.

Door handle 10 is disposed preferably horizontally in a non-actuated position in a state mounted on door leaf 46 and actuation element 12 is preferably disposed in such a manner at least partially in door handle 10 that a positioning movement of actuation element 12 and a corresponding pressure F of a user can be performed on handle surface 14 of actuation element 12 in the direction of gravity g. This allows using actuation element 12 preferably simultaneously with a downward pressing of door fitting 100.

Preferably, container 28 is connected to door handle 10 via an outlet side or via an outlet section 48 having a connector 26, preferably by means of a screw connection which is sealed by means of sealing rings. Preferably, container 28 is disposed above door handle 10 in a direction of gravity g, meaning a liquid in container 28 flows in the direction of door handle 10 and preferably no complex pumping mechanism is required.

Container 28 is closed by a lid 60, which is preferably disposed opposite outlet section 48 and is screwed onto an inlet section. Preferably, lid 60 seals container 28 to prevent the sanitizer from evaporating. Further preferably, the lid is lockable for security reasons.

Figure 2A:
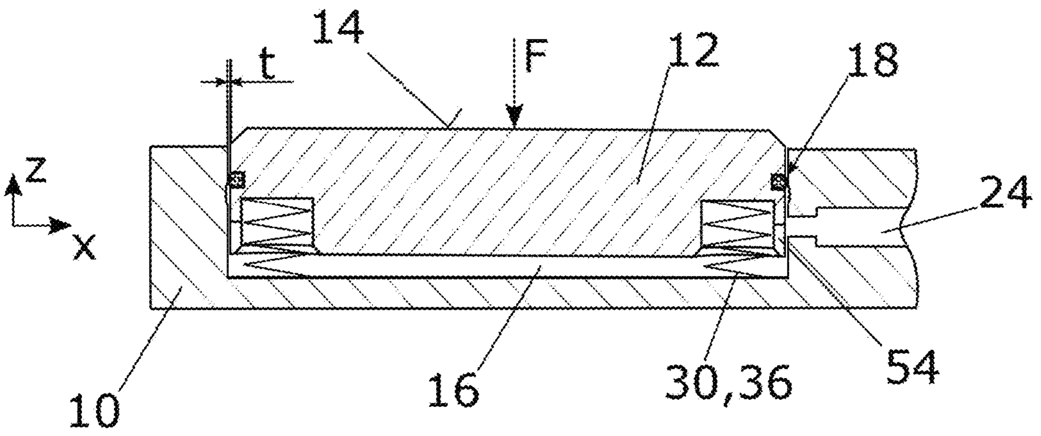
FIG. 2*a* shows a longitudinal cut of the actuation element and a detail of a longitudinal cut of the door handle in an x-z plane according to FIG. 1.

According to FIG. 2*a*, a hollow 16 is delimited in the interior of door handle 10 via actuation element 12 in the non-actuated first position of actuation element 12. Door handle 10 is pierced by a channel 24, which opens into hollow 16 on one end and is connected to a container 28 one another end by means of a connector 26 (cf. FIG. 1) to conduct a liquid, in particular a sanitizer, from container 28 to hollow 16 via channel 24 and connectors 26.

Preferably, channel 24 is inserted in door handle 10 along a longitudinal axis 50 of door handle 10, for example by door handle 10 having an open bore on a side facing bolt 40 and a resulting opening being closed via glue or screws or alternatively by a connector, e.g., a tube, being fixed to a container 28. Furthermore, actuation element 12 preferably has a notch 54, which preferably is opposite the opening of channel 24 in the first position of actuation element 12, meaning the liquid can flow to hollow 16 unhindered in the first position of actuation element 12.

Figure 2B:
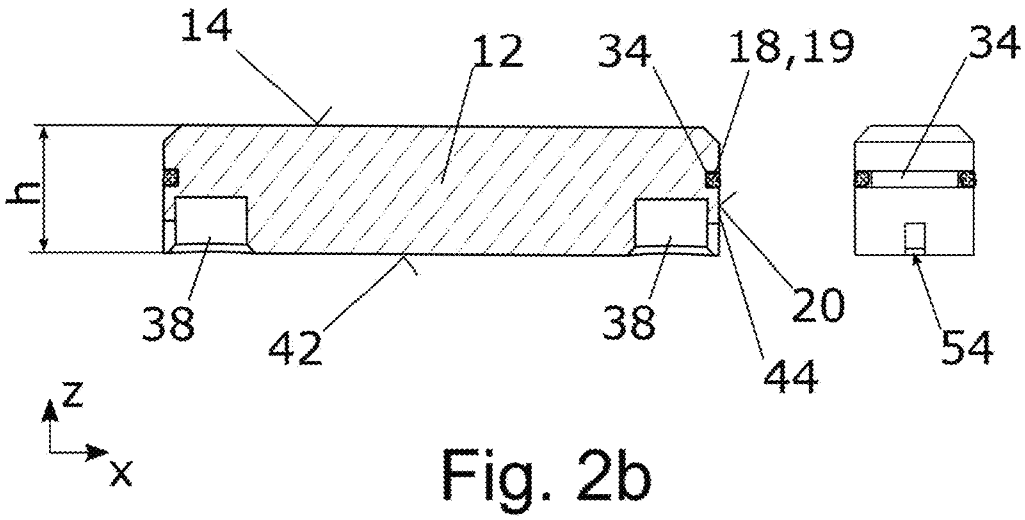
FIG. 2*b* shows a longitudinal cut of the actuation element in an x-z plane according to FIG. 2*a* and a lateral view of the actuation element.

In the mounted state, actuation element 12 has a gap 52 on the lateral walls, which has a distance t to door handle 10, a sealant 18 being in gap 52 to seal hollow 16. In particular, sealant 18 is disposed between a first sealing surface 20 of actuation element 12, according to FIG. 2*b*, and a second sealing surface 22 of door handle 12, according to FIG. 2*c*.

Figure 2C:
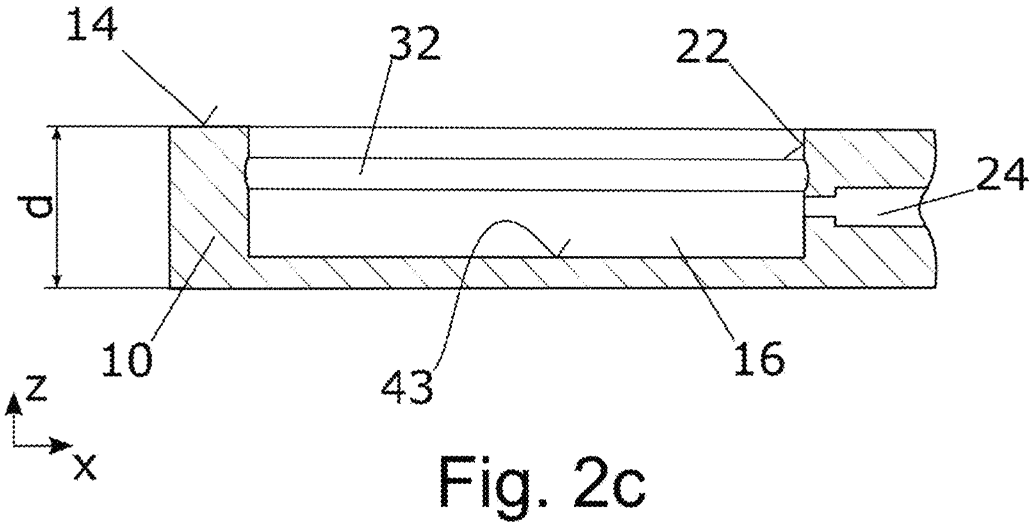
FIG. 2*c* shows a detail of a longitudinal cut of the door handle in an x-z plane according to FIG. 2*a;*

According to FIG. 2*c*, a cutout 32 is further formed in second sealing surface 22 of door handle 10. Alternatively or additionally, cutout 32 can also be formed in first sealing surface 20 of actuation element 12. Preferably, cutout 22 can be produced semicircular and by means of a router bit.

Actuation element 12 can be used manually using a pressure F against preferably two return elements 30 and is displaceable from a first position to a second and third position according to FIG. 3*a* to FIG. 3*c*.

Figure 2D:
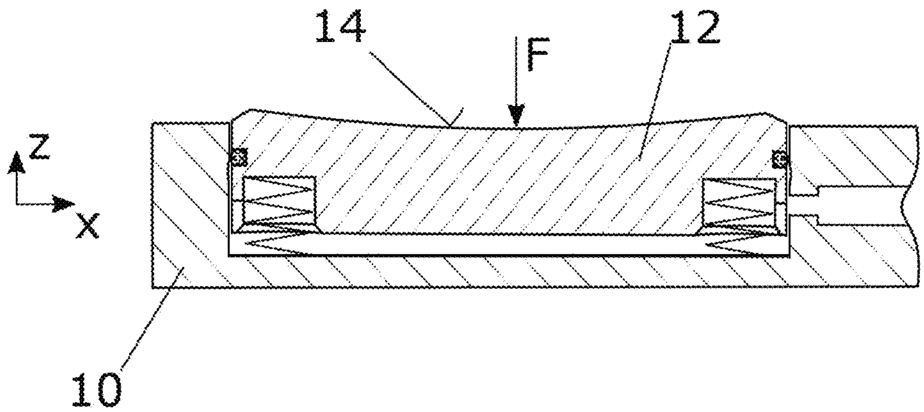
FIG. 2*d* shows a longitudinal cut of the actuation element and a detail of a longitudinal cut of the door handle in an x-z plane according to FIG. 2*a*.

In an alternative embodiment, handle surface 14 of actuation element 12 can be formed concave in the direction of hollow 16 according to FIG. 2*d*. In this context, the concave shape is carried out in one direction, preferably in several directions, to favor a gathering of liquid in handle surface 14 of actuation element 12. Since the concave shape is carried out in the direction of hollow 16, a leaking from handle surface 14 is advantageously prevented. The amount of accumulated liquid corresponds preferably to the amount of liquid received in a user's hand. The gathering of liquid advantageously prevents a direct evaporation of sanitizer before it can be received in a user's hand.

In FIG. 3*a* to FIG. 3*b*, door handle 10 having actuation element 12 is shown in a transition of actuation element 12 from the first position to a second position, the volume of hollow 16 being reduced in the second position according to FIG. 3*b* with respect to the first position according to FIG. 3*a*. In the second position, sealant 18 is in the area of cutout 32. Via cutout 32, gap distance t between first sealing surface 20 and second sealing surface 22 is enlarged, whereby sealant 18 is at least partially released from one of sealing surfaces 20, 22. This allows hollow 16 to be partially opened, and the liquid in hollow 16 displaced by actuation 12 can flow to handle surface 14 through gap 52 between actuation element 12 and door handle 10.

Via a preferred horizontal mounting of door handle 10 on bolt 40 and a preferred positioning movement of actuation element 12 in the direction of gravity g, the positioning movement reducing the volume of hollow 16, the liquid is distributed particularly evenly in handle surface 14 and the liquid flows particularly evenly between sealing surfaces 20, 22 along the circumference of actuation element 12.

In the second position of actuation element 12, channel 24 is covered at least partially by a blocking section 44 in actuation element 12, preferably simultaneously with the opening of hollow 16. This leads to channel 24 being at least partially closed or blocked on one end and the flow resistance is increased to the extent that a gravity-induced supply of liquid from container 28 to handle surface 14 is at least partially hindered.

In FIG. 3*c*, a third position of actuation element 12 is shown in which the volume of hollow 16 is further reduced with respect to the second position, gap distance t also being reduced in the area of sealant 18 and sealant 18 abutting against both sealing surfaces 20, 22 in the first position to entirely close channel 24 and hollow 16. In this third position, door handle 10 can be held without additional liquid flowing to handle surface 14 due to gravity.

In the third position, actuation element 12 abuts preferably against bottom 43 or is disposed over bottom 43 of hollow 16 at a slight distance, meaning the entire liquid if possible is displaced from hollow 16 via actuation element 12 and contaminated liquid cannot gather in hollow 16.

Sealant 18 is preferably an elastic O-ring 19, which is fit in a groove 34 in a sealing surface 20 of actuation element 12 according to FIG. 2*a*. Alternatively, groove 34 can be disposed in a sealing surface 22 of door handle 10, cutout 32 preferably being disposed in sealing surface 20 of actuation element 12. According to FIG. 3*a* and FIG. 3*c*, O-ring 19 preferably partially abuts against sealing surface 22 of the door handle in an area of cutout 32 in the first and the third position of actuation element.

Return elements 30 are preferably designed such that in the first position of actuation element 12 according to FIG. 2*a* or FIG. 3*a*, an adherence between sealant 18 and sealing surfaces 20, 22 is larger than a force of return elements 30 to attain a wedged fastening of actuation element 12 in door handle 10.

Preferably, return elements 30 are prestressed such that at least one part of sealant 18 is pressed into a gap 52 between sealing surfaces 20, 22. In particular an elastic sealant 18, preferably an O-ring 19, is pressed into groove 34 and gap 52 in an area of sealing surfaces 20, 22 outside of cutout 32. In this state, the adherence between sealant 18 and sealing surfaces 20, 22 is particularly strong and preferably greater than the force of return elements 30. In this context, a part of sealant 18 can expand in cutout 32, whereby sealant 18 is additionally clamped in the area of cutout 32 via the geometric change of gap distance t. By wedging sealant 18, the sealing of hollow 16 and the fixation of actuation element 12 in door handle 10 is simultaneously enabled.

Preferably, gap distance t or the size and position of sealant 18 is realized such that sealant 18 can be pressed and mounted via gap 52, though the sealing effect already takes place as soon as sealant 18 partially abuts against an area of cutout 32. For dismounting actuation element 12, an adherence and preferably also a geometrically caused shear force is to be overcome at cutout 32 to release sealant 18. Owing to this, actuation element 12 is fixated in door handle 10 in a particularly easy manner without any further fixating elements being required.

As return elements 30, preferably two springs 36, in particular spiral coiled springs, are used, which are each guided in an indentation 38, in particular in a blind bore, in actuation element 12. This enables a particularly even positioning movement of actuation element 12 and prevents a wedging of actuation element 12 at one of sealing surfaces 20, 22. For this reason, indentations 38 are also preferably guided at the outer areas of actuation element 12 in the longitudinal direction. Spring 36 is in particular a compression spring, which is prestressed in the first position of actuation element 12 and can be pressed together via a force F of a user and thus act as a return element.

The force of return element 30 is preferably chosen such that the transition from the second position to the third position of actuation element 12 is displaceable using a slight manual force F via a user, meaning a spiral coiled spring is actuated, actuation element 12 is displaced to the third position and hollow 16 is closed again after actuation element 12 is used, in particular after a common use of door fitting 100.

Door handle 10 is preferably made of a cylindrical round component, the diameter of door handle 10 being between 18 mm and 22 mm and handle surface 14 of door handle 10 being formed having a length of preferably 80 mm to 120 mm. In this context, a partial area of door handle 10, in which a container 28 is fastened, is not deemed part of handle surface 14.

Hollow 16 is preferably an oblong hole in cylindrical door handle 10 and preferably disposed centrally in handle surface 14. In this context, length l of the oblong hole is preferably between 65 mm and 75 mm and breadth b of the oblong hole is preferably between 10 mm and 14 mm. The depth of the oblong hole in door handle 10 is preferably between 14 mm and 17 mm.

The shape of actuation element 12 is preferably adapted to hollow 16 realized as the oblong hole, the length and the breadth of actuation element 12 being yielded from the dimensions of hollow 16 excluding gap distance t. The surface of actuation element 12 forming a handle surface 14 preferably has a rounded or beveled edge, so that the transition from the area of handle surface 14 of door handle 10 to the area of handle surface 14 of actuation element 12 extends preferably continuously or at a slight edge height in the first position of actuation element 12. Height h of actuation element 12 is preferably 15 mm to 17 mm. This height ensures that actuation element 12 does not become wedged with the inner surfaces of hollow 16 during a positioning movement.

Gap t between sealing surfaces 20, 22 and outside of cutout 32 is preferably 0.1 mm to 0.5 mm wide. Owing to the narrow breadth, a good guiding of actuation element 12 is enabled and a wedging can be prevented in conjunction with mentioned height h of actuation element 12, meaning actuation element 12 is displaced as evenly as possible and the liquid dispensed along the circumference of actuation element 12 is even.

Furthermore, a groove 8 for accommodating sealant 18 is preferably formed in the circumferential direction of actuation element 12 and is preferably disposed between 8 mm and 9 mm from underside 42 of actuation element 12.

A breadth of groove 34 is preferably larger than the diameter of O-ring 19 to enable deforming O-ring 19 within the groove as soon as it is spanned between sealing surfaces 20, 22. The diameter of the cross section of O-ring 19 and the depth of groove 34 depends on gap distance t between sealing surfaces 20, 22. The increase of the gap distance in the area of cutout 32 in turn depends on the diameter of the cross section of O-ring 19. Preferably, the depth of groove 34 is selected such that 20% to 40% of the O-ring diameter protrudes from groove 34. In this context, gap distance t outside of cutout 32 should at least be smaller than the protrusion of the O-ring diameter to ensure a sufficient seal effect. For mounting, actuation element 12 is pressed into hollow 16 with O-ring 19, O-ring 19 deforming elastically. Actuation element 12 is displaced so far until O-ring 19 expands in the area of cutout 32 and becomes wedged in the first position via return elements 30. A preferred O-ring diameter is 1.5 mm to 2 mm.

In the mounted state of actuation element 12 in hollow 16, a distance between underside 42 of actuation element 12 and bottom 43 of hollow 16 is between 0 mm and 3 mm depending on the position of actuation element 12. As described previously, cutout 32 is disposed and dimensioned such that sealant 18 seals hollow 16 in the first and third position. For this reason, the dimension and position of cutout 32 can be determined from the position of sealant 18 and the desired distance between underside 42 of actuation element 12 and bottom 43 of hollow 16, cutout 32 preferably being inserted at a distance of 8 mm to 13 mm from bottom 43 of hollow 16.

Blocking section 44 is formed at least in an area of sealing surface 20 of actuation element 12, which faces an opening of channel 32 in hollow 16. The size of blocking element 44 is determined by notch 54 in actuation element 12, a height of notch 54 in actuation element 12 being selected such that the outlet of channel 24 is opened in hollow 16 in a first position of actuation element 12. Preferably, the height of notch 54 in actuation element 12 is between 3 mm and 4 mm. For this purpose, it is further preferred if notch 54 forms a penetration to indentation 38 of return means 30.

In the mounted state of actuation element 12, the volume of hollow 16 preferably corresponds to 2.2 $cm^3$ to 3 $cm^3$ in the first position of actuation element 12. Preferably, the liquid volume, which reaches handle surface 14 via actuation element 12 via a positioning movement from the first position to the third position, is between 1 ml to 3 ml.

Particularly preferably, door handle 10 and actuation element 12 is made of metal, preferably aluminum or stainless steel.

Handle surface 14 preferably has a rough surface treated abrasively, preferably by means of sand jets or shot-blasting, having a surface roughness between 20 μm and 40 μm measured according to ISO 8503, in order to enlarge the contact angle between the handle surface 14 and a sanitizer.

As shown in FIG. 1, door handle 10 is preferably mounted at a right angle on bolt 40 and is screwed in place to prevent a rotation about a longitudinal center axis 50 of door handle 10. Door handle 10 has a tapered section 56 on one end which pierces bolt 40. Preferably, bolt 40 is hollow, and a screw for fastening door handle 10 can be screwed in a thread in the interior of bolt 40 in the direction of a longitudinal axis of bolt 40 on a preferably plane surface of tapered section 56 of bolt 40. In the mounted state of bolt 40 on a door leaf 46, this screw is not accessible to a user without having to dismount bolt 40, thus providing a certain amount of anti-theft protection.

Particularly preferably, force F on door handle 10 for actuating door fitting 100, in particular for deforming a torsion spring, corresponds to at least a force for displacing actuation element 12 to the third position against the force of return elements 30. This aids making the door handle having actuation element leak-proof in a sense, as hollow 16 and/or channel 24 is closed in the third position of actuation element 12. The torsion spring can be disposed in a mounting element 58 of door fitting 100, the torsion spring being stressed between bolt 40 and mounting element 58 via a relative rotational movement.

As also shown in FIG. 1, door handle 10 can be mounted on one or both sides of a door, as door fitting 100 consists of a dismountable door handle 10 and bolt 40. As long as a bolt 40 is provided having an appropriate mounting accommodation, door handle 10 can be disposed in any rotated orientation around longitudinal axis 50 of door handle 10, unlike a door fitting 100 having a one-piece bolt 40 and door handle 10.

In another embodiment, a container 28 is attached to door leaf 46 and connected to channel 24 of door handle 10 by means of a tube.

Figure 4A:
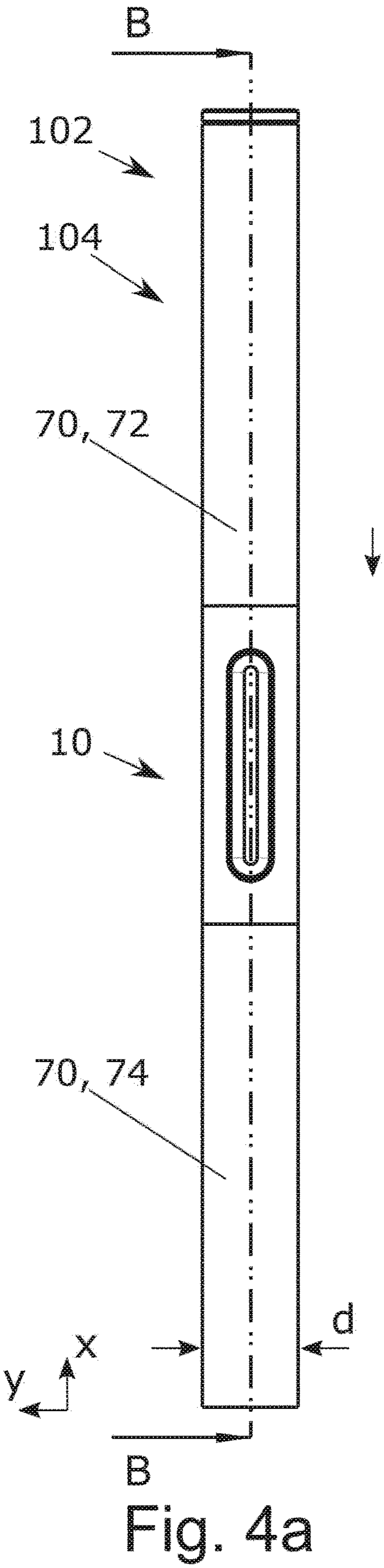
FIG. 4*a* shows a top view of a pull handle having a door handle in an x-y plane.
Figure 4B:
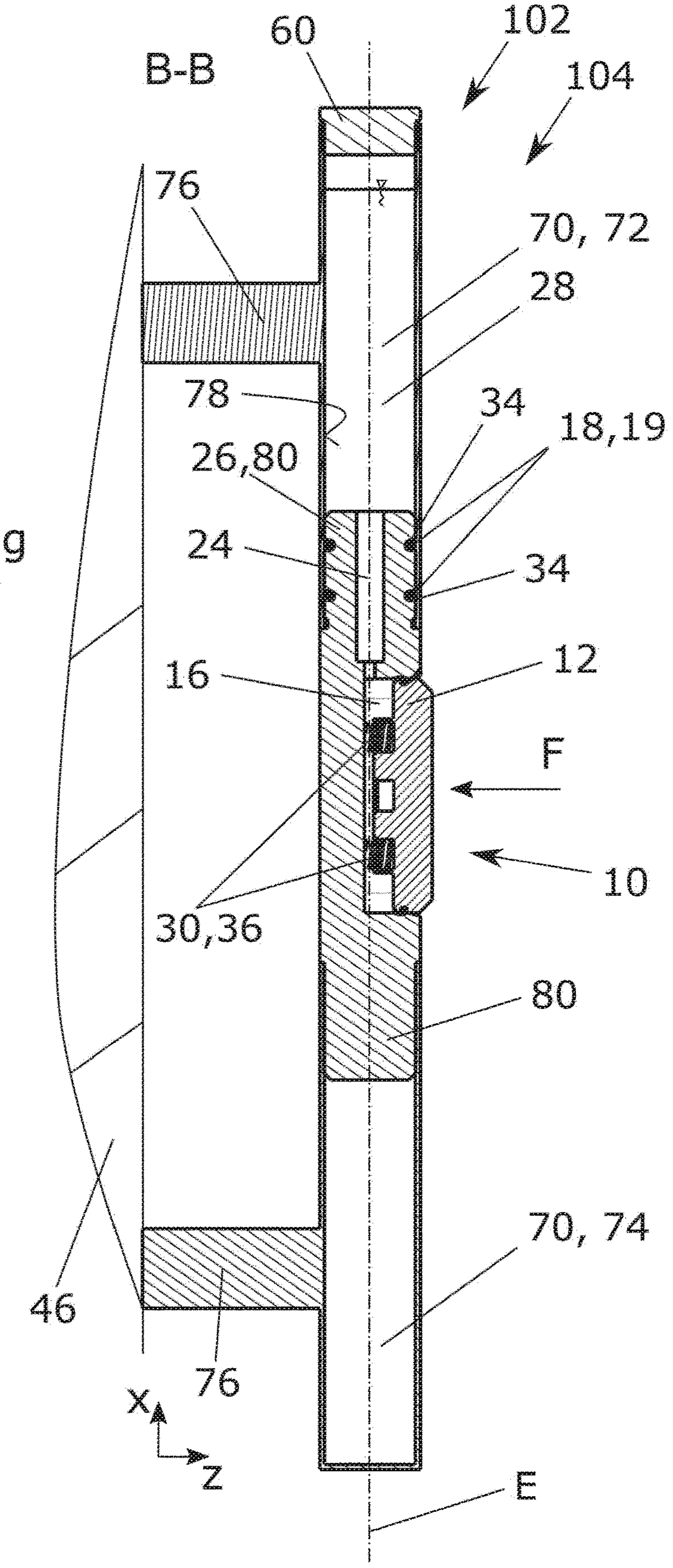
FIG. 4*b* shows a cut through the pull handle according to FIG. 4*a* along a cut axis B-B in an x-z plane.
Figure 4C:
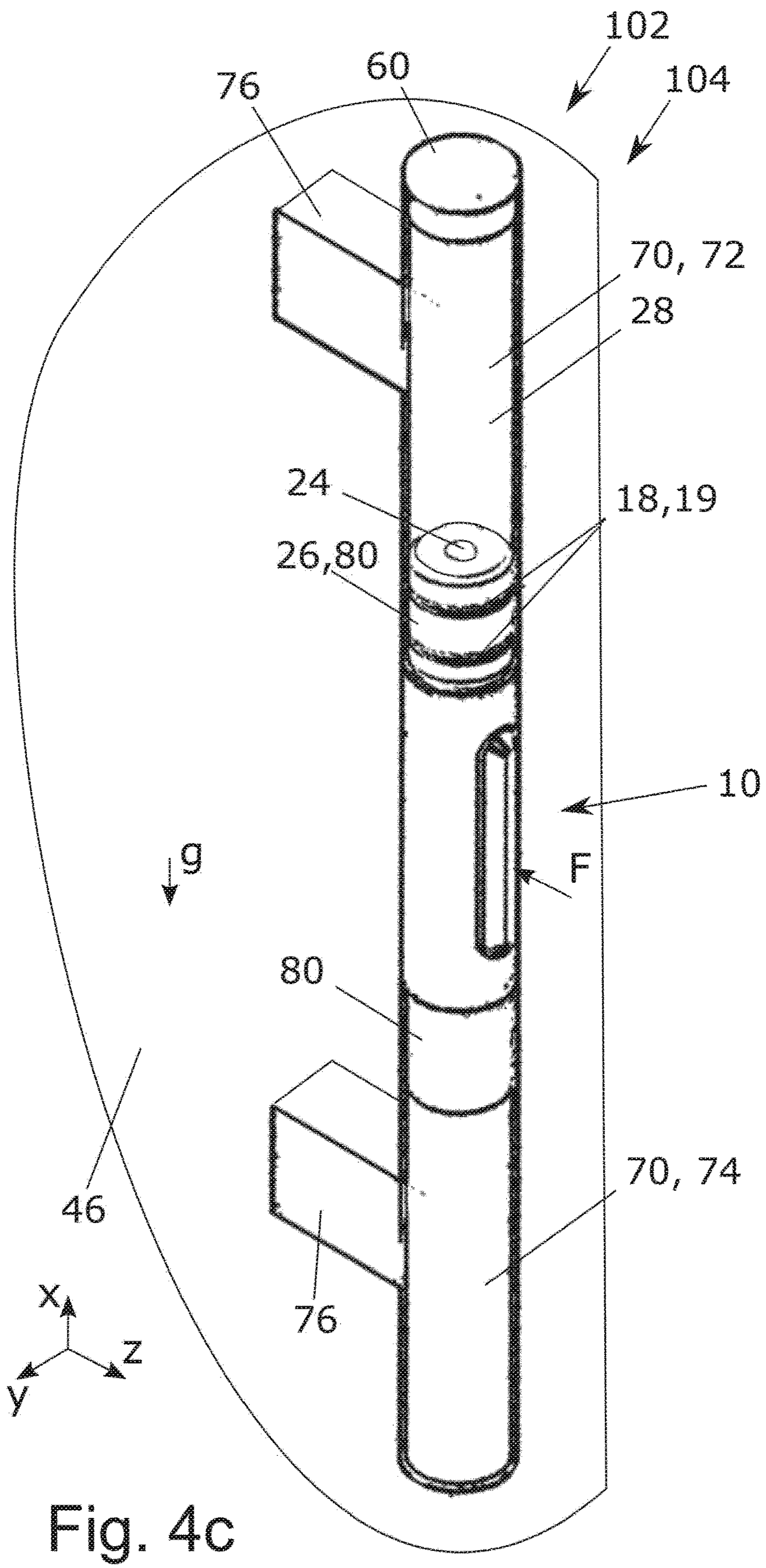
FIG. 4*c* shows a perspective view of the pull handle according to FIG. 4*a* and FIG. 4*b*.

In FIG. 4*a*, FIG. 4*b* and FIG. 4*c*, door handle 10 is shown as a pull handle 102 which is mounted on a schematically illustrated door leaf 46. In contrast to door fitting 100 described above, pull handle 102 is fixedly connected to door leaf 46 and door handle 10 is connected to door leaf 46 so as to not be moveable or rotatable, a door preferably being able to be opened via a pulling movement applied to pull handle 102.

In comparison to door handle 10 shown in FIG. 1, door handle 10 shown in this instance forms a cylindrical or tube-shaped handle bar 104 having an extension axis E in conjunction with accommodators 70, actuation element 12 also being in the non-actuated first position analogous to FIG. 1 and FIG. 2*a*.

Pull handle 102 preferably has a first and a second tube-shaped accommodating section 72, 74 as accommodators 70, door handle 10 having male or cross-sectionally reduced connection sections 80 on both sides and being able to be inserted in both first and second tube-shaped accommodating section 72, 74. Preferably, this results in door handle 10 being disposed centrally along handle bar 104.

Advantageously, door handle 104 does not have cross-sectional protrusions between door handle 10 and first and second accommodating sections 72, 74 and an outer diameter d continuous along extension axis E, meaning handle bar 104 is able to be cleaned particularly easily and impurities not being able to gather in the transition from door handle 10 to first and second accommodating sections 72, 74.

Preferably, handle bar 104 has a length of 250 mm and 800 mm, particularly preferably 400 mm, and a diameter d of 18 mm to 55 mm, particularly preferably 30 mm; a user should be able to at least partially enclose handle bar 104 with one hand.

As is shown in particular in FIG. 4*b*, first tube-shaped accommodating section 72 is designed as container 28 to accommodate a liquid, in particular a sanitizer. In this context, first accommodating section 72 is connected to connectors 26 of door handle 10 in a liquid-tight manner on one end. For this purpose, sealants 18, in particular two O-rings 19 in a guide groove 34 each, are disposed and pressed, for sealing, between connectors 26 of door handle 10, which is simultaneously designed as a cross-sectionally reduced and cylindrical connection section 80, and interior 78 of first accommodating section 72. Connector 26 is pierced by channel 24 to guide liquid from container 28 to hollow 16 of door handle 10. Preferably, cross-sectionally reduced connection section 80 designed as connector 26 has an open bore in the direction of hollow 16 for forming channel 24 along extension axis E.

In comparison to the embodiment in FIG. 1, tapered section 56 shown in this instance is designed as connector 26 and is pierced by channel 24.

In particular via pressed-in sealants 18, door handle 10 is connected to first accommodating section 72 in a force-fit manner. Via lower second accommodating section 74, door handle 10 having the cross-sectionally reduced connection section 80 is in addition disposed so as to be connected in a form-fitting manner and is connected to door leaf 46 in the mounted state of pull handle 102.

First accommodating section 72 has a lid 60 on its other end for closing first accommodating section 72 designed as container 28. Owing to this, container 28 can be easily filled or refilled with liquid.

Lid 60 can be connected to container 28 in a force-fit and/or form-fitting manner, an insertable or screwable lid 60 being preferred. Further preferably, lid 60 is secured against theft or an undesired filling of the container via a security mechanism (not illustrated), in particular a lockable lock. Alternatively, screwable lid 60 can have notches, in particular two bores, preferably blind bores, as a security mechanism in a front face along extension axis E, the notches being able to be only used using a corresponding special tool.

The container preferably has a volume of 100 ml to 700 ml, particularly preferably 400 ml, a larger volume being preferred to yield as many actuation cycles as possible.

FIG. 4*a* and FIG. 4*b* show first and second tube-shaped accommodating section 72, 74 each having a mounting element 76 to mount handle bar 104 on door leaf 46. A distance between handle bar 104 and leaf 46 is formed in such a manner via mounting elements 76 that a user can manually enclose handle bar 104.

Preferably, extension axis E of handle bar 104 is oriented along the direction of gravity g, first accommodating section 72 being above door handle 10 in such a manner that the liquid in container 28 flows through channel 24 to hollow 16 and preferably no complex pumping mechanism is required.

Door handle 10 having actuation element 12 is shown in FIG. 4*b* essentially analogous to the one in FIG. 2*a* and is usable analogous to the previously described figures, actuation element 12 in this instance preferably being able to be actuated using pressure F, in particular a pressure against door leaf 46 and return elements 30, in particular two pressure springs 36, in a direction perpendicular to the direction of gravity g.

Unlike FIG. 1 and FIG. 2*a*, door handle 10 shown in this instance for being mounted as pull handle 102 has cross-sectionally reduced connection sections 80 on both sides, container 28 being connected to door handle 10 along extension axis E or longitudinal center axis 50 of the door handle, and channel 24 piercing door handle 10 and connector 26 along extension axis E.

Actuation element 12 is disposed in particular in such a manner on handle bar 104 opposite mounting elements 76, in particular by rotating door handle 10 around extension axis E, that actuation element 12 is usable via pressure F in the form of a manually executed pressure, in particular using a heel of a user's hand, and simultaneously the door can be opened via a pressure.

Particularly preferably, pressure F on door handle 10 for actuating pull handle 102, in particular to displace a door in a door hinge against a return element, corresponds to at least a force in order to displace actuation element 12 to the third position against the force of return elements 30. This allows making door handle 10 leak-proof in a sense, as hollow 16 and/or channel 24 is closed in the third position of actuation element 12.

Alternatively, door handle 10 can be disposed so as to be rotatable around extension axis E about 180°, actuation element 12 then being able to be used preferably via a tensile force, in particular using the fingers of the user's hand.

REFERENCE NUMERALS

10 door handle
12 actuation element
14 handle surface
16 hollow
18 sealant
19 O-ring
20 first sealing surface of the actuation element
22 second sealing surface of the door handle
24 channel
26 connector
28 container
30 return element
32 cutout
34 groove
36 springs
38 indentation in the actuation element
40 bolt
42 underside of the actuation element
43 bottom of the hollow
44 blocking section
46 door leaf
48 outlet section of a container
50 longitudinal center axis
52 gap
54 notch in the actuation element
56 tapered section of the door handle
58 mounting element of the door fitting
60 lid of the container
70 tube-shaped accommodating section
72 first accommodating section
74 second accommodating section
76 mounting element of the pull handle
78 interior of the first accommodating section
80 cross-sectionally reduced connection section of the door handle
100 door fitting
102 pull handle
104 handle bar
E extension axis of handle bar 104
b, l breadth and length of the hollow
d diameter of the door handle
t gap distance between the sealing surfaces
F pressure of a user on the actuator element
h height of the actuator element
g direction of gravity
x, y, z axis lines of a Cartesian coordinate system

The invention claimed is:

1. A door handle having an actuation element (12) for sanitizing a handle surface (14) of the door handle (10), the actuation element (12) being disposed at least partially in the door handle (10) and delimiting a hollow (16) in the interior of the door handle (10) in a first non-actuated position, the door handle (10) being pierced by a channel (24) which opens into the hollow (16) on one end and has a connector (26) on another end for a connection to a container (28) to guide a liquid from the container (28) to the hollow (16) via the channel (24) and the connector (26), the actuation element (12) being manually displaceable against at least one return element (30), wherein the hollow (16) is sealed by means of at least one sealant (18) between a first sealing surface (20) of the actuation element (12) and a second sealing surface (22) of the door handle (10), wherein the sealant (18) is an elastic o-ring (19) fit in a groove (34) in one of the first and second sealing surfaces (20, 22), a cutout (32) being formed in a surface of the other of the first and second sealing surfaces (20, 22) that is opposite to the groove (34), wherein the o-ring moves outside of the cutout (32) in a second position of the actuating element (12) decreasing the volume of the hollow (16) with respect to the first non-actuated position, a blocking section (44) of the first sealing surface (20) being disposed and oriented such that, at a transition between the hollow (16) and the channel (24), the blocking section (44) of the actuation element (12) at least partially closes or blocks the channel (24) when displacing the actuation element (12) from the first non-actuated position to the second position, the actuation element (12) displacing the liquid from the hollow (16) towards the handle surface (14) and the sealant (18) abutting against both sealing surfaces (20, 22) in a third position of the actuation element (12) further reducing the volume of the hollow (16) with respect to the second position in order to entirely close the hollow (16).

2. The door handle according to claim 1, wherein the actuation element (12) is disposed in such a manner at least partially in the door handle (10) that a positioning movement of the actuation element (12) reducing the volume of the hollow (16) is executable in the direction of gravity (g) when the door handle (10) is mounted on a door leaf (46).

3. The door handle according to claim 1, wherein the container (28) is connected to an outlet side or an outlet section (48) on the door handle (10) in a liquid- tight manner in the direction of gravity (g).

4. The door handle according to claim 1, wherein the return elements (30) comprise at least two springs (36) which are each guided in an indentation (38) in the actuation element (12).

5. The door handle according to claim 1, wherein the door handle (10) is designed as a cylindrical round component having a diameter (d) between 18 mm and 22 mm, the hollow (16) being realized as an oblong hole in the door handle (10) having a length (l) between 65 mm and 75 mm and a breadth (b) between 10 mm and 14mm and a gap (t) between the sealing surfaces (20, 22) and outside of the cutout (32) being between 0.1 mm and 0.5 mm wide.

6. The door handle according to claim 1, wherein the volume of the hollow (16) corresponds to 2.2 $cm^3$ to 3 $cm^3$ in the first position of the actuation element (12).

7. The door handle according to claim 1, wherein the door handle (10) and the actuation element (12) are made of metal.

8. The door handle according to claim 1, wherein the handle surface (14) has a rough surface treated abrasively, having a surface roughness between 20 μm and 40 μm measured according to ISO 8503.

9. A door fitting having a bolt (40) and a door handle (10) having an actuation element (12) according to claim 1, wherein the door handle (10) is mounted at a right angle on the bolt (40) and is screwed in place to prevent a rotation about a longitudinal center axis (50) of the door handle (10).

10. A door having a door fitting according to claim 9, wherein the door handle (12) is mounted on one or both sides of a door.

11. The door according to claim 10, wherein a container (28) is fixed to a door leaf (46) and is connected to the channel (24) of the door handle (10) by means of a tube.

12. A pull handle comprising the door handle (10) having an actuation element (12) according to claim 1, wherein the pull handle (102) has accommodators (70) which together with the door handle (10) form a cylindrical or tube-shaped handle bar (104) having a shared extension axis E, the accommodators (70) forming the container (28) as a first tube-shaped accommodating section (72), which is connected to the connectors (26) of the door handle (10) on one end.

13. The pull handle according to claim 12, wherein the door handle (10) is connected in an insertable manner to the first tube-shaped accommodating section (72) on one end and to a second tube-shaped accommodating section (74) on another end, the connectors (26) of the door handle (10) having circumferential sealants (18) in order to seal the first tube-shaped accommodating section (72) as a container (28).

14. A door having at least one pull handle (102) according to claim 12, wherein the cylindrical handle bar (104) of the pull handle (102) is mounted on the accommodators (70) on one or both sides of the door using at least one mounting element (76).

15. The door according to claim 14, wherein the extension axis (E) of the pull handle (102) is oriented in such a manner that a liquid flows to the door handle (10) in the first tube-shaped accommodating section (72) by means of gravity (g), the extension axis (E) of the pull handle (102) being oriented parallel to the direction of gravity (g).

16. The door handle according to claim 1, wherein the liquid is a sanitizer.

* * * * *